United States Patent
Kothandaraman

(10) Patent No.: US 7,782,341 B2
(45) Date of Patent: *Aug. 24, 2010

(54) IN PLACE ROTATION OF IMAGES FOR LOW MEMORY SYSTEMS

(75) Inventor: Sreenivas Kothandaraman, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/372,452

(22) Filed: Mar. 8, 2006

(65) Prior Publication Data

US 2008/0036791 A1 Feb. 14, 2008

Related U.S. Application Data

(60) Provisional application No. 60/659,703, filed on Mar. 8, 2005.

(51) Int. Cl.
*G09G 5/00* (2006.01)
(52) U.S. Cl. .................. 345/658; 345/649; 345/653; 345/654; 345/656
(58) Field of Classification Search .......... 345/649, 345/653, 654, 656, 658; 382/296, 297
See application file for complete search history.

(56) References Cited

U.S. PATENT DOCUMENTS

| | | | | | |
|---|---|---|---|---|---|
| 5,034,733 | A | * | 7/1991 | Okazawa et al. | 382/297 |
| 5,598,181 | A | * | 1/1997 | Kermisch | 345/658 |
| 5,909,222 | A | * | 6/1999 | Umeshima | 345/658 |
| 6,275,622 | B1 | * | 8/2001 | Krtolica | 382/296 |
| 6,280,767 | B1 | * | 8/2001 | Sano et al. | 424/456 |
| 6,360,305 | B1 | * | 3/2002 | Novak et al. | 711/157 |
| 6,992,708 | B1 | * | 1/2006 | Sasaki | 348/222.1 |
| 7,164,489 | B2 | * | 1/2007 | Li et al. | 358/1.16 |
| 2005/0243103 | A1 | * | 11/2005 | Rudolph | 345/647 |

* cited by examiner

*Primary Examiner*—Ulka Chauhan
*Assistant Examiner*—Jeffrey J Chow
(74) *Attorney, Agent, or Firm*—Robert D. Marshall, Jr.; W. James Brady; Frederick J. Telecky, Jr.

(57) ABSTRACT

Rotation in the storage domain is a one-one function with the domain equal to the range. This permits an image to be rotated in place. Each image size implies at least one garland of closed chains of pixels. Each image includes a spanning set of these garlands. Rotation in place moves each pixel to the next location on its garland. On completion of a garland by return to the initial pixel, pixels on the next garland are moved. Image rotation is complete after all the garlands have been traversed.

16 Claims, 6 Drawing Sheets

110

| a | b | c | d |
| e | f | g | h |
| i | j | k | l |

| i | e | a |
| j | f | b |
| k | g | c |
| l | h | d |

| a | b | c | d |
| e | f | g | h |
| i | j | k | l |

| a |
| b |
| c |
| d |
| e |
| f |
| g |
| h |
| i |
| j |
| k |
| l |

| i | e | a |
| j | f | b |
| k | g | c |
| l | h | d |

| i |
| e |
| a |
| j |
| f |
| b |
| k |
| g |
| c |
| l |
| h |
| d |

*FIG. 3b*

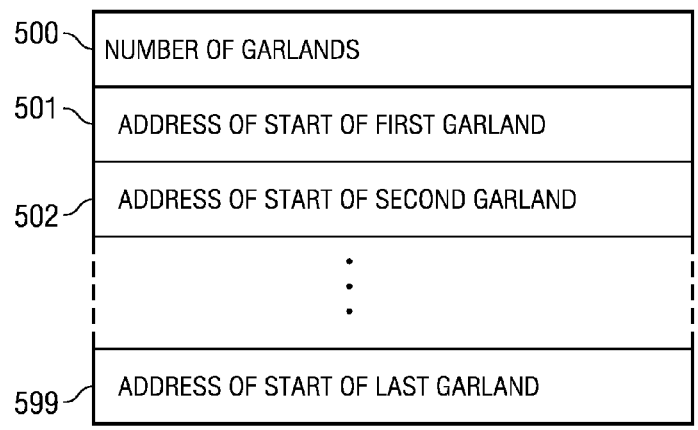

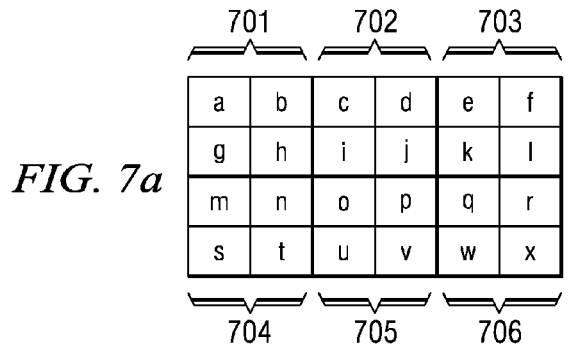
FIG. 7a
FIG. 7b
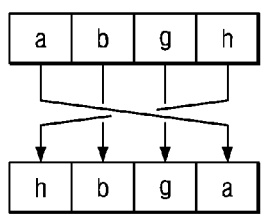
FIG. 8
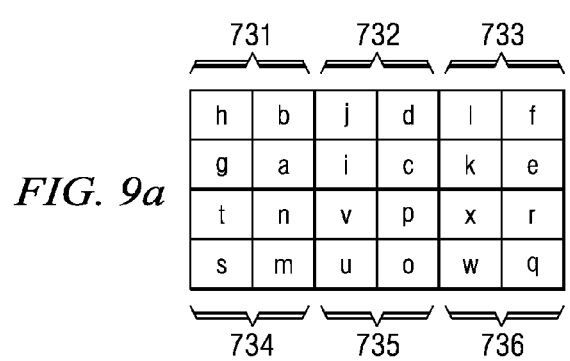
FIG. 9a
FIG. 9b

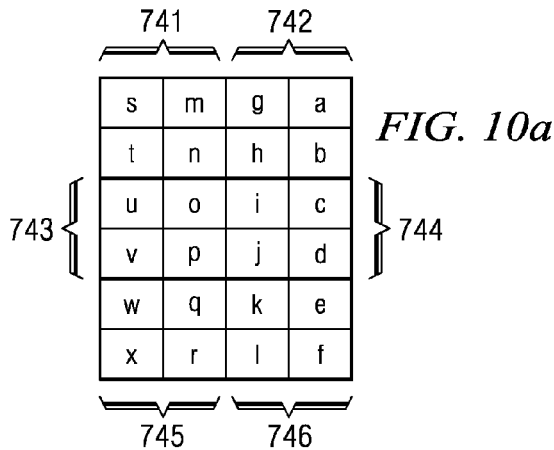

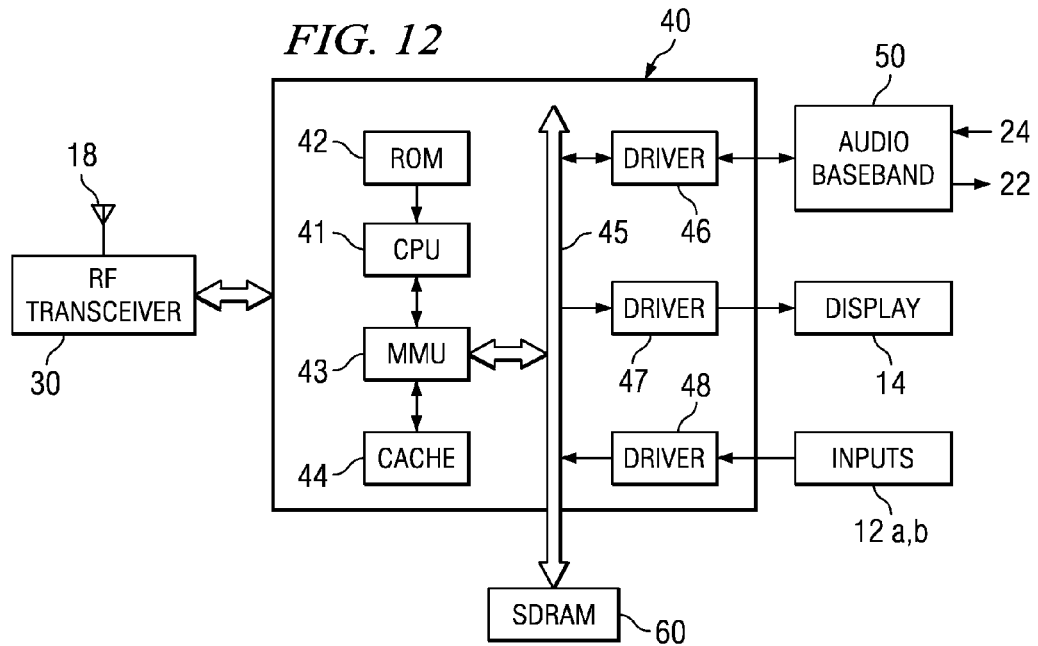
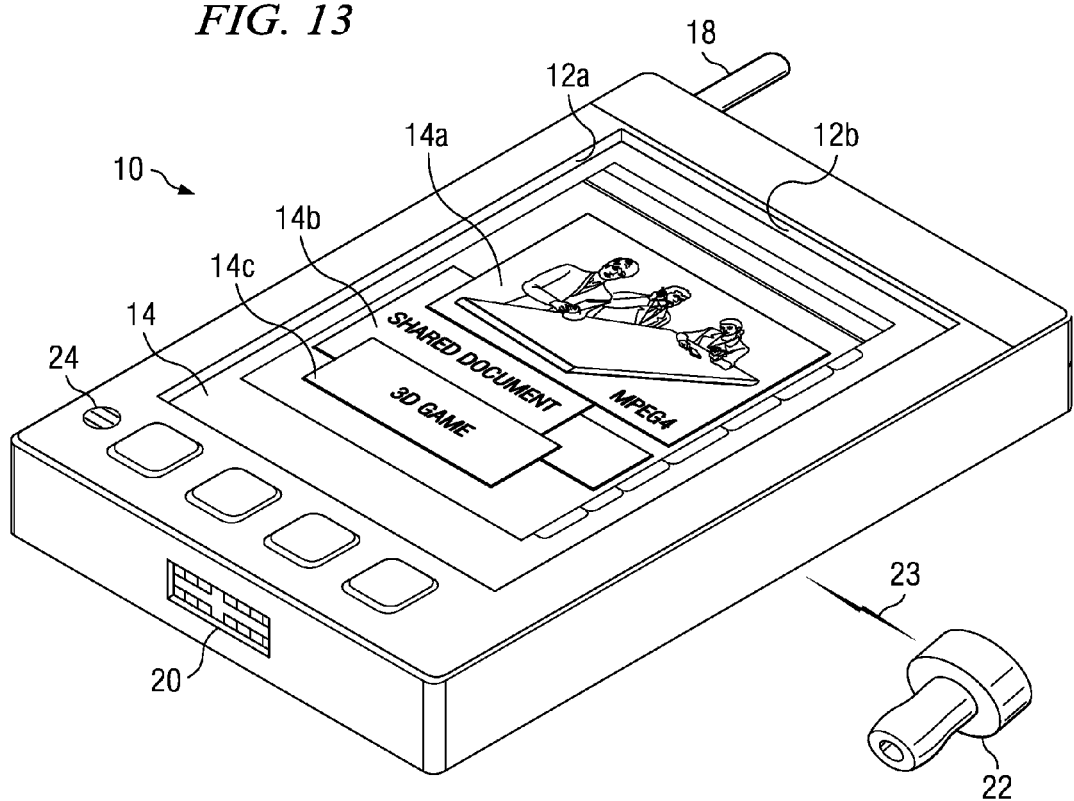

IN PLACE ROTATION OF IMAGES FOR LOW MEMORY SYSTEMS

CLAIM OF PRIORITY

This application claims priority under 35 U.S.C. 119(e)(1) to U.S. Provisional Application No. 60/659,703 filed Mar. 8, 2005.

TECHNICAL FIELD OF THE INVENTION

The technical field of this invention is computer image manipulation.

BACKGROUND OF THE INVENTION

Image rotation typically requires two image buffers in memory. One image buffer stores the original image and another stores the rotated image. This takes up a lot of memory. The problem is to reduce memory requirement under the condition that the original image is not required after the rotation.

BRIEF DESCRIPTION OF THE DRAWINGS

These and other aspects of this invention are illustrated in the drawings, in which:

FIG. 1 illustrates an original image and a resultant image of an example image rotation;

FIG. 2 illustrates the example original image and a linear memory view of this original image;

FIG. 3 illustrates the example rotated image and a linear memory view of this rotated image;

FIG. 5 illustrates a preferred embodiment of storing identification of the garlands for a particular image;

FIG. 6 illustrates a method for determining the garlands of the example original image;

FIG. 7 illustrates an example image and the linear memory view of the example image for a super-pixel alternative embodiment of this invention;

FIG. 8 illustrates an intermediate pixel swapping operation in the super-pixel alternative embodiment of this invention;

FIG. 9 illustrates the pixel swapped image and a linear memory view of this pixel swapped image;

FIG. 10 illustrates the results of applying the garland, rotate in place operation of this invention on the swapped super-pixel image illustrated in FIG. 9;

FIG. 11 illustrates an alternative tiled operation of this invention using memory sliding;

FIG. 12 illustrates a block diagram of a wireless telecommunications device to which the invention is applicable; and FIG. 13 illustrates a perspective view of the wireless telecommunications device of FIG. 12.

SUMMARY OF THE INVENTION

Figure 4A:
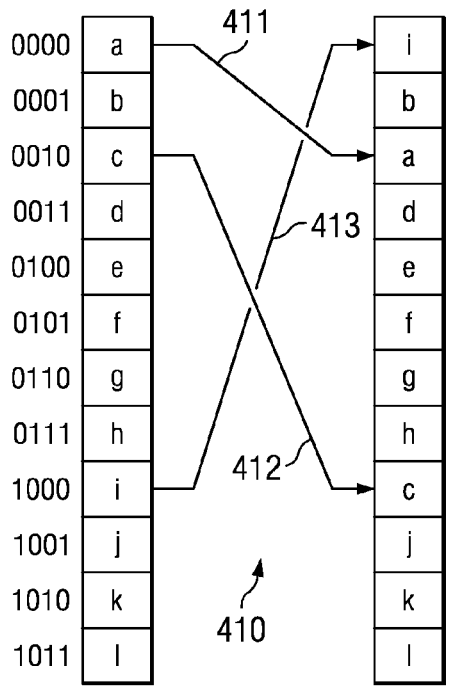
FIG. 4 illustrates the garlands of the transformation of the example original image to the rotated image.

This invention uses only one image buffer to go from the original image to the rotated image. The pixels in the original image are shuffled in the original memory locations to obtain the rotated image. This halves the image buffer memory requirement.

DETAILED DESCRIPTION OF PREFERRED EMBODIMENTS

FIG. 1 illustrates an example rotation operation to which this invention applies. FIG. 1a illustrates original image 110. Original image 110 is a three row by four column image including pixels a to l. FIG. 1b illustrates rotated image 120. Rotated image 120 is a four row by three column image of the same pixels a to l.

Image rotation according to the prior art requires two image buffers as large as the original image. The first image buffer stores the original image. The second image buffer stores the rotated image. According to the prior art, image rotation takes place by copying each pixel from its position in the original image into the corresponding position of that pixel in the rotated image. This prior art process requires computation of the position within the rotated image that stores each pixel of the original image. This process is not difficult. The principle disadvantage of this prior art process is the requirement for two image buffers. In systems with little memory, such as portable systems powered by batteries, this could be a severe limitation.

This invention proposes to move pixels within the original image buffer in a manner that rotates the image without requiring a second image buffer. There is no other prior art solutions to the image rotation problem that requires only one image buffer. All other known solutions require two image buffers. This invention reduces memory requirement and enables image rotation in low memory systems that were previously considered in sufficient for image rotation.

This application will provide a theoretical background to the invention. A pixel frame (or just frame) of width W and height H, [W,H], is defined as the set:

$$[W,H]=\{(x, y): x, y \in Z, 0 \leq x < W, 0 \leq y < H\}$$

An image is a function that maps a frame to a set of scalars. For example:

$$I:[W,H] \rightarrow \{0, 1, \ldots, 255\}$$

The $\pi/2$ (90°) frame rotation function, $R_2$: $[W,H] \rightarrow [H,W]$ is defined as:

$$R_2(x, y)=(y, W-1-x)$$

It is easily observed that $R_2$ is one-one and onto function. Therefore, $R_2$ admits an inverse.

The Rotation of I (I: $[W,H] \rightarrow \{0, 1, \ldots, 255\}$) is the function:

$$I_R: [H,W] \rightarrow \{0, 1, \ldots, 255\}$$

defined by:

$$I_R(x, y)=I(R_2^{-1}(x, y))$$

A frame store, [HW], is defined as the set:

$$[HW]=\{x: x \in Z, 0 \leq x < HW\}$$

The frame storage function S: $[W,H] \rightarrow [HW]$ that stores a two dimensional frame of width W and height H in memory is defined as:

$$S(x,y; W)=yW+x$$

It is easily observed that S is one-one and onto function. Hence, S admits an inverse. Indeed, the display function is defined as the inverse of the storage function and is derived to be:

$$S^{-1}(n; W)=(n \% W, \lfloor n/W \rfloor)$$

Where: n % W=mod(n,W); and $\lfloor n/W \rfloor$=floor(n/W), that is the greatest integer in the ratio.

The stored version of image I (I: [W,H]→{0, 1, ..., 255} is defined as the function $I^S$: [HW]→{0, 1, ..., 255}, where $I^S(n)=I(S^{-1}(n;W))$ and S: [W,H]→[HW] is the storage function.

The π/2 frame rotation function in storage domain, R: [HW]→[HW], is defined by the composition of the functions:

$$R(n)=S(R_2(S^{-1}(n;W));H)$$

This can be simplified as:

$$R(n) = S(R_2(S^{-1}(n; W)); H)$$
$$= S(R_2(n \% W, \lfloor n/W \rfloor); H)$$
$$= S(\lfloor n/W \rfloor, W - 1 - n \% W; H)$$
$$R(n) = HW - H - (n \% W)H + \lfloor n/W \rfloor$$

The stored and rotated version of image I: [W,H]→{0, 1, ..., 255} is the function:

$$I_S^R: [HW] \to \{0, 1, \ldots, 255\}$$

defined by:

$$I_S^R(n)=I_R(S^{-1}(n;H))$$

where:

$$S: [H,W] \to [HW]$$

is the storage function and:

$$I_R: [H,W] \to \{0, 1, \ldots, 255\}$$

is the rotated version of image I.

The rotated version of the stored image $I^S$: [HW]→{0, 1, ..., 255} is the function:

$$I_S^R: [HW] \to \{0, 1, \ldots, 255\}$$

defined by:

$$I_S^R(n)=I^S(R^{-1}(n))$$

where: R is the Rotation Function in storage domain. It is easily shown that $I_S^R = I_R^S$.

Since R is the composition of one-one and onto functions, R is one-one and onto as well. Consequently, R admits an inverse.

If $R^0(n)=n$ and $R^m(n)=R(R^{m-1}(n))$ for m∈Z, m>0, then for every n∈[HW] there exists an M∈Z, 0<M≦HW such that $R^M(n) \neq n$ and $R^m(n) \neq n$ for all m∈Z, 0<m<M. Further, if p, q are such that 0<p, q<M, p∈(Z), then $R^p(n)=R^q(n)$ if and only if p=q. The set $\{R^0(n), R^1(n), \ldots, R^{M-1}(n)\}$ denoted by G(n) is called the garland of n.

If p∉G(n), then G(p)∩G(n)={ }.

Given R: [HW]→[HW], there exists a set, S={$p_1, p_2, \ldots, p_N$}, such that S⊂[HW] and $G(p_1) \cup G(p_2) \cup \ldots \cup G(p_N)$=[HW].

Thus there exists a spanning set, S={$p_1, p_2, \ldots, p_N$}, such that $p_i \in G(p_j)$ if and only if i=j. This S is called a minimum spanning set. Thus every image can be traversed by a finite number of closed garlands.

Let I[0: (HW−1)] be the array containing the stored image $I_S$. The algorithm below details the steps in transforming this array inplace to store $I_S^R$. Let S={$p_1, p_2, \ldots, p_N$} be a minimum spanning set.

```
for i = 1 to N {
    index = p_i
    saved = I(index)
    while(R(index) ≠ p_i) {
        swap(I(R(index)),saved)
        index = R(index)
    }
    I(p_i) = saved
}
```

Whenever the frame size or the rotation angle changes, a new minimum spanning set needs to be identified. This needs to be stored in memory. This is the only additional memory required. In practice this requirement is small. Only 2 bytes are required for popular image resolutions like QVGA and CIF.

This process will be further explained in conjunction with FIGS. 2 to 5. FIG. 2 illustrates the example original image and a linear memory view of this original image. FIG. 2a illustrates example image 110 of pixels a to 1 as previously shown in FIG. 1a. Memory used for image buffers is essentially linear, that is, each datum is stored at a location corresponding to an address. FIG. 2b illustrates the linear view 115 of the original image. FIG. 3 illustrates the example rotated image and a linear memory view of this rotated image. FIG. 3a illustrates example image 110 of pixels a to 1 as previously shown in FIG. 1b. FIG. 3b illustrates the linear view 125 of the rotated image.

FIG. 4 illustrates the method of this invention. This process is essentially the same as shown in the program code loop above. In the example there are four garlands 410, 420, 430 and 440. FIG. 4a illustrates garland 410. This method begins by storing pixel a located at linear address 0000 in a pixel buffer. The rotated position for pixel a is address 0010. The method stores pixel c currently in that location into a second pixel buffer. Pixel a from the first buffer is stored into memory location 0011. This process is illustrated schematically via ray 411. The method next determines the rotated position for pixel c. As explained above, this is known from the dimensions of the original image and can be easily calculated. In this example pixel c goes into memory location 1000 in the rotated image. Pixel I originally stored in that location is stored in the first buffer and pixel c now stored in the second buffer is stored in memory location 1000 as illustrated schematically by ray 412. The method determines the memory location for just displaced pixel i is memory location 0000. Pixel i is stored in memory location 0000 as illustrated by ray 413. Note this is the original starting location, therefore garland 410 is complete.

Figure 4B:
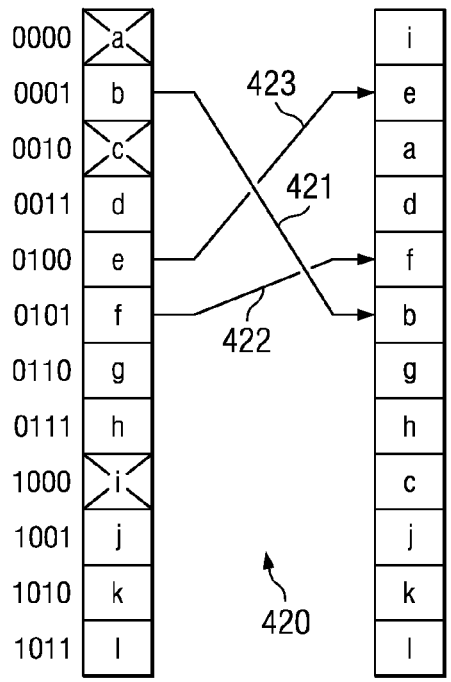

FIG. 4b illustrates garland 420. FIG. 4b shows memory locations 0000, 0010 and 1000 crossed out. These pixels were previously moved in garland 410. Garland 420 includes starts at memory location 0001 originally storing pixel b. Ray 421 shows moving pixel b to memory location 0101. Ray 422 shows moving pixel f to memory location 0100. Ray 423 shows moving pixel e to memory location 0001, the original starting location of garland 420.

Figure 4C:
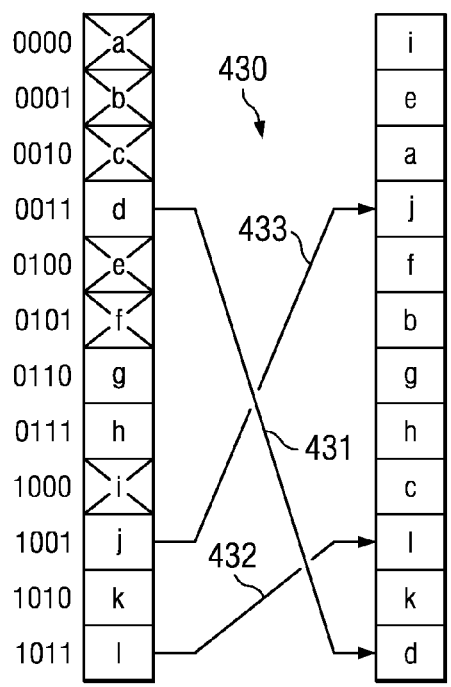

FIG. 4c illustrates garland 430. FIG. 4c shows memory locations 0000, 0001, 0010, 0100, 0101 and 1000 crossed out. These pixels were previously moved in garlands 410 and 420. Garland 430 starts at memory location 0011 originally storing pixel d. Ray 431 shows moving pixel d to memory location 1011. Ray 432 shows moving pixel l to memory location 1001. Ray 433 shows moving pixel j to memory location 0011, the original starting location of garland 430.

Figure 4D:
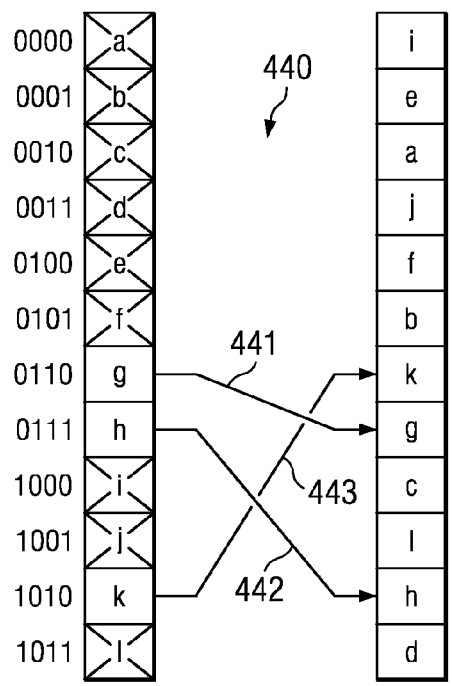

FIG. 4d illustrates garland 440. FIG. 4d shows memory locations 0000, 0001, 0010, 0011, 0100, 0101, 1000, 1001 and 1011 crossed out. These pixels were previously moved in garlands 410, 420 and 430. Garland 440 starts at memory location 0110 originally storing pixel g. Ray 441 shows moving pixel g to memory location 0111. Ray 442 shows moving pixel h to memory location 1010. Ray 443 shows moving pixel k to memory location 0110, the original starting location of garland 440.

As a result of the swaps of the four garlands 410, 420, 430 and 440, the image appears as illustrated in FIG. 3 in rotated form. This method requires very little additional memory above the original image buffer. The two required pixel buffers would generally be embodied in the data processor register file and use no additional external memory. The program code to calculate the next location is generally of the same size as the program code of the prior art for calculating the position to store a next pixel in the second image buffer.

This method requires a manner of identification of the set of spanning garlands. FIG. 5 illustrates a preferred embodiment of this identification. Data 500 stores the number of garlands in the spanning set. Data 501 stores a start address for the first garland. As shown, each garland is a closed loop, therefore any address within the garland will specify the garland because the calculation of the next position will return to this start address. It is considered convenient to set the start address of the first garland as the upper left pixel, pixel a in this example. Data 502 stores a start address for the second garland. It is considered convenient to set this start address for the second garland as the first pixel in the linear memory view not included in the first garland. Each further entry specifies a start address for the next garland until data 599 stores the start address for the last garland.

FIG. 6 illustrates a manner for determining the garlands necessary to span a particular image array. The process begins with an image buffer the size of the array filled with 0's. FIG. 6a illustrates the linear memory view of the memory contents for the example array. The determination process begins at the upper left pixel of the array, in this example memory location 0000. This memory location is the start address of the first garland. The method places a 1 into this memory location. The method calculates the position of the next element in the garland starting at the upper left pixel. The calculation is the same calculation as used in the transformation illustrated in FIG. 4. The process places a 1 in this memory location. The process then calculates the position of the next element in the garland and places a 1 in this location also. This process proceeds for the first garland until it returns to the original start position at the upper left pixel. Return to this position can be determined by comparing the current memory address with the start address of that garland or by reading the data stored at the new location and determining it non-zero. The process sets to number of garlands to 1. FIG. 6b illustrates the memory status following tracing the first garland, in this case garland 410 of FIG. 4.

The process then searches for another memory location not within the previous garlands. This search conveniently starts at addresses following the initial address at the upper left. In this example the next zero memory location is 0001. The process places a 2 into this memory location, marking this memory location as on the second garland. The process continues as outlined above with respect to the first garland. The process places a 2 in each memory location in this second garland and stops when it returns to the start address. FIG. 6c illustrates the memory contents following this second garland 420.

FIG. 6d illustrates the memory contents following the third garland 430 which places a 3 in each memory location. FIG. 6e illustrates the memory contents following the fourth and last garland 440 which places a 4 in each memory location. This search process ends when there are no more zero memory location. That process yields the number of garlands required to span the entire array and a start location for each garland.

This invention could operate in two differing manners regarding determination of the spanning set of garlands. The invention could determine the spanning set of garlands each time a rotation operation is required. This would be most useful in a system that needs to do image rotation on images of many differing sizes. Alternatively, the system could have stored, pre-calculated data such as illustrated in FIG. 5 provided for each image size to be rotated. This has the advantage over the prior technique of being faster at the expense of additional storage required for storing this data for each supported image size. The particular technique used should be based upon whether the manufacture believes that speed or memory use is more important.

It might seem that larger image arrays would require more garlands to form a spanning set. In fact, this is not the case. Large arrays tend to have no more than and generally fewer garlands in their spanning sets than small arrays. With the number of garlands generally low, the memory required to store the identity of the garlands according to claim 5 is low. Thus this invention is advantageous This invention does have one disadvantage. It is highly serial, moving individual pixels. If you store the image in external memory, as likely when limiting the on-chip memory required for image rotation, the algorithm requires the round-trip time (read then write) to external memory at least 2*H*W times. This is because each pixel is read and written once. This makes poor use of memory bandwidth. Most of the cost of accessing external memory lies in the latency of the access and not the actual data movement itself. This is a consequence of dependent nature of each loop iteration, that each future iteration relies on the previous iteration completing. Depending on the locality of a given garland, a data cache may reduce redundant memory accessed, however this seems unlikely.

An alternative embodiment uses the parallelism between garlands. Since the garlands are disentangled, a programmer can employ instruction parallelism by processing each garland in parallel. Using multiple CPUs, multiple threads or other method to hide the latency of one access under the latency of another, this may provide a performance boost. This technique may be used in data processors which schedule overlapped processing of plural garlands at run time (superscalar) or in data processors which are statically scheduled (very long instruction word, VLIW).

It possible to subdivide a garland, thereby achieving parallelism within a garland. For instance, if you cut a garland in half and keep track of the endpoints where the segments attach, you can derive parallelism within a garland. Since each garland is a non-overlapping chain, there is no data dependency between widely different portions of a garland. Care would be required in assembling the endpoints of garland segments, but this isn't insurmountable. This alternative requires a small amount of additional on-chip storage related to the number of segments within the garlands. This is similar to the process of parallelizing a serial polynomial calculation expressed in Horner's rule form, a method to speed up the highly serial CRC-32 calculation. This alternative could also be valuable in a multi-processor or latency-overlapping context.

It would be tempting to try to apply this technique to tiles of pixels to obtain further parallelism. Replacing pixel with tile enables generation of garlands for a much lower resolution image. The same spanning rules permit the algorithm to apply to tiles instead of pixels. Then each tile could be rotated, either before or after the rotation of the plural tiles, to achieve a final result. This attractive seeming extension of the invention does not work as expected.

The problem with using tiles is that the tile has to be an atomic unit of storage for the technique to operate. FIG. 7 illustrates the problem. FIG. 7a illustrates a four row by six column image of pixels a to x also divided into 6 two by two tiles 701, 702, 703, 704, 705 and 706. In this example the word width of the data processor enables storage of two packed pixels, such as pixels a and b illustrated in FIG. 7a. The tile problem would be similar even if one data word stored only one pixel.

FIG. 7b illustrates the linear memory view of this image. This illustrates the normal manner of storing images with all pixels from a current row stored after all pixels from the preceding row. Thus tile 701 of FIG. 7a is stored as two discontinuous data words at 711 and 721 in FIG. 7b. Similarly tile 704 of FIG. 7a is stored as two discontinuous data words 714 and 724 in FIG. 7b.

There is a further alternative permitting the use of super-pixels. Each super pixel is stored in contiguous memory and can be accessed as a unit. The super pixel size may be set by the data width of the data processor performing the operation or by the SDRAM burst width. FIG. 7 illustrates an example of two pixels per super pixel in the data processor data width.

The super-pixels must first be mixed. FIG. 8 illustrates this mix for tile 701 in the example of FIG. 7. Two pixels a and h are swapped. Some data processors which can operate in as single instruction multiple data (SIMD) mode on plural data within a data word include data swizzle instructions in their instruction set enabling performance of this mixing operation in one or a few instructions. If no such swizzle operations are available in the data processor instruction set, the mix can still be achieved in a few operations using Boolean logic. First, each input data word is masked to limit the data to the high data (pixels a and g) and a second masking to limit the data to the low data (b and h). The high data (pixel a) of the first input data word is shifted to the least significant bits and ORed with the low data (pixel h) of the second input data word yielding the first output data word. The second output data word is similarly formed. In this example, this results in swapping two pixels within the pair of data words.

FIG. 9 illustrates the result of this mix for the entire array. FIG. 9a illustrates the image view of the mixed array. FIG. 9b illustrates the linear memory view of the mixed array. This linear view of FIG. 9b includes memory addresses for reference. This mixed super pixel array is then rotated in place in a manner similar to that described above. The exact data moves are not the same for the same size array, but the garland theory still holds and there are a limited number of garlands that traverse the whole image. Each super pixel is treated as a unit. In this example, there is a single garland traversing the four row by three columns of super-pixels to form a six row by three column rotated result. This garland is as follows: data word h:b is moved to memory address 0011; data word g:a is moved to memory address 0001; data word j:d is moved to memory address 0111; data word v:p is moved to memory address 0110; data word t:n is moved to memory address 0010; data word l:f is moved to memory address 1011; data word w:q is moved to memory address 1000; data word x:r is moved to memory address 1010; data word u:o is moved to memory address 0100; data word i:c is moved to memory address 0101; data word k:e is moved to memory address 1001; data word s:m is moved to memory address 0000 completing the garland.

FIG. 10 illustrates the resulting rotated data. FIG. 10b illustrates the linear memory view shifted according the single garland noted above. FIG. 10a illustrates the image view of three rows by two columns of tiles 741, 742, 743, 744, 745 and 746 and six rows and four columns of pixels a to x.

FIG. 11 illustrates a further alternative that is similar to tiling but not quite the same which involves rotating tiles. The low-resolution tile image is not rotated directly. Each tile is broken up into a column of wide-pixels. Each wide-pixel occupies contiguous memory locations. The rotation function for these wide-pixels is different from regular rotation but it still includes garlands as described above. This algorithm operates on wide-pixels one at a time. The wide-pixels can be of length up to the greatest common divisor of the height and width of the image. A convenient choice for the width of a wide-pixel is the burst length of an SDRAM burst.

If the tiles are square, then the tiles are each atomic. Tiles should be not merely have simple linear contiguity but contiguous in 2 dimensions. The problem with using tiles is that image is generally stored in memory with all pixels from the current row stored after all pixels from the preceding row. Additional problems occur when the image is non-square.

Consider a simple example of a 4 by 4 tile in a 24 by 32 image. The first row of the original tile starts at memory location 0; the second row starts at memory location 24; the third at 48; and the fourth row starts at 72. However for the top left tile of the rotated image the first row starts at 0; the second at 32; the third at 64; the fourth at 96. These correspond to rows from four different tiles from the original image. Therefore when you swap along the garland, each tile affects four other tiles.

The problem is one dimensional since memory is one dimensional. Non-square tiles do not have a fixed row pitch for the tiles in both starting and ending images. The non-square tiles need to re-pitch upon rotation.

If the row pitch is constant and this algorithm is applied to tiles, the tiles themselves get correctly shuffled. The row pitch of the pixel information within each tile retains the row pitch of the original image, which is undesirable. Thus, you must shuffle the tiles contents at some point to adjust it to the new image pitch.

Alternately, with small additional storage, the algorithm can collect up the contents of each row of tiles, making each tile's contents linearly contiguous. This is illustrated in FIG. 11. The additional storage required equals one row of tiles in the larger of either the original or rotated image width. FIG. 11a illustrates allocating storage equal to one row of tiles just prior to the frame in memory. The process of this alternative embodiment slides the frame into that extra tile row while reorganizing the tile contents. FIG. 11b illustrates the results of this step. The reorganized tiles are denoted a' to r'. Each tile is reorganized to into contiguous memory. The extra tile row enables the frame to remain contiguous in memory.

The linearized tiles are processed with the garland in place rotation method. This works correctly on the reorganized tiles because each tile now appears just like a giant pixel. Each reorganized tile is a giant linear block of bytes.

FIG. 11c illustrates the results after the rotation is complete. The final step regenerate the original 2-D structure of each tiles with the correct pitch by sliding the image forward working from the bottom up. Following this process each tile is de-linearized so that each pixel resides where it did originally. The tiles are also re-pitched if the tiles are non-square. The result is illustrated in FIG. 11d. This is the desired rotate image.

The following is an example C code to implement this alternative embodiment for the 32 by 24 pixel image with 4 by 4 pixel tiles.

```
/* ---------------------------------------------------- */
/*    Assume 32x24 image, 4x4 tiles.                    */
/*    Linearize the 4x4 tiles, sliding backwards in memory */
/*    by precisely 4 rows. Image buffer is 36x24, with  */
/*    source image starting at row 4.                   */
/* ---------------------------------------------------- */
    po = image ;
    for (y = 0; y < 24; y += 4)
        for (x = 0; x < 32; x += 4)
            for (yy = 0; yy < 4; yy++) /* linearize the tile */
            {
                /* point into tile to linearize */
                pi = image + (4 + y + yy)*32 + x;
                for (xx = 0; xx < 4; xx++)
                    *po++ = *pi++;
            }
/* ---------------------------------------------------- */
/* Image rotation algorithm goes here. Each "pixel"     */
/*    is 16 elements in the original array.             */
/* ---------------------------------------------------- */
        /* .... */
/* ---------------------------------------------------- */
/* Restore the 2-D structure of the tile, this time as a */
/* 24x32 image. Once this completes, the upper left      */
/* corner of the rotated image will be at offset 32*4.   */
/* ---------------------------------------------------- */
    pi = image + 32*24 - 1;
    for (y = 28; y >= 0; y -= 4)
        for (x = 20; x >= 0; x -= 4)
            for (yy = 3; yy >= 0; yy--)
                /* delinearize the tile */
            {
                /* point to tile's final home */
                po = image + (4 + y + yy)*24 + x + 3;
                for (xx = 3; xx >= 0; xx++)
                    *po-- = *pi--;
            }
```

One minor issue may arise if the image is a tall image with the number of rows (H) greater than the number of columns (W). In this case the image buffer requires one additional row of tile storage for the larger of H or W.

Both the linearization and delinearization are regular processes that can be accomplished entirely with direct memory access (DMA) transfers. This alternative method can be generalized to different tile sizes and different image dimensions.

These steps aren't required if either of these two conditions are met:

1. The image is square. (H==W).

2. The source and destination images have the same row pitch. This is not equivalent to H==W. You can store an image in a buffer with wider pitch than the image's width. Many graphics environments will round the horizontal dimension to the next higher power of two to accelerate address computations.

This alternative embodiment is summarized as follows:

1. Slide image upwards while assembling rotated super-pixels.

2. Apply swap-along-garland for image made up of super-pixels.

3. Slide image downwards while disassembling super-pixels.

At each step 2*Height*Width bytes are read from and written to memory. This alternative embodiment requires 2*max(height,width)*block_size extra external memory and block_size*block_size*2 extra internal memory.

FIGS. 12 and 13 illustrate an exemplary embodiment of a wireless telecommunications device 10 to which this invention is applicable. FIG. 12 is a block diagram view of device 10. FIG. 13 is a perspective view of device 10. In this example device 10 is a mobile personal digital assistant (PDA). Device 10 includes display 14 and integrated input sensors 12a, 12b located in the periphery of display 14 (FIG. 13). As shown in FIG. 12, system 10 includes digital signal processor 40 connected to input sensors 12a,b via driver 48, A stylus or finger can be used to input information to the PDA via input sensors 12a, 12b. Display 14 is connected to digital signal processor 40 via driver 47. Display 14 provides graphical and video output in overlapping windows, such as MPEG video window 14a, shared text document window 14b and three dimensional game window 14c, for example.

Radio frequency (RF) transceiver 30 is connected to aerial 18 and to digital signal processor 40 and provides a wireless network link. Connector 20 is connected to a cable adaptor-modem (not shown) and thence to digital signal processor 40 via an adaptor (not shown). This provides a wired network link for use during stationary usage in an office environment, for example. A short distance wireless link 23 is also "connected" to earphone 22 and is driven by a low power transmitter (not shown) which is part of audio baseband integrated circuit 50. Microphone 24 is similarly connected to digital signal processor 40 via audio baseband integrated circuit 50 and driver 46 enabling two-way audio information exchanged with other users on the wireless or wired network using microphone 24 and wireless ear piece 22.

Digital signal processor 40 includes central processing unit (CPU) 41, read only memory (ROM) 42, memory management unit (MMU) 43, cache memory 44, system bus 45 and drivers 46, 47 and 48. CPU 41 provides the major intelligence of device 10 including, for example, coding and decoding messages from RF transceiver 30, error correction and echo cancellation, interface with audio baseband integrated circuit 50 via driver 46, with display 14 via driver 47 and with inputs 12a and 12b via driver 48 under control of programs stored in ROM 42. ROM 42 preferably stores the program and data to implement this invention. MMU 43 coordinates communication within digital signal processor 40 via system bus 45. This includes communication with synchronous dynamic random access memory (SDRAM) 60 via system bus 45 and temporarily storing data and instructions in cache 44.

What is claimed is:

1. A method of in-place image rotation of an image stored in a memory from an original image to a rotated image comprising the steps of:

identifying a spanning set of garlands corresponding to said original image, each garland consisting of a closed path of chain links including an initial chain link from a memory location of an initial pixel in said original image to an intermediate memory location of said initial pixel in said rotated image and subsequent chain links from a prior intermediate memory location of a prior intermediate pixel in the original image to a further intermediate memory location of said prior intermediate pixel in said rotated image, until said further intermediate memory location returns to said memory location of said initial pixel, said spanning set of garlands together identifying all data movement necessary to transform said original image into said rotated image by moving each pixel only once from a memory location in said original image to a memory location in said rotated image;

identifying an initial pixel for each of the identified garlands;
said steps of identifying a spanning set of garlands corresponding to an initial image and identifying an initial pixel for each of the identified garlands include
filling an image buffer having dimensions equal to dimensions of the image with zeros,
initializing a garland count to 1, and repetitively until all pixels of the image buffer are non-zero:
searching the image buffer for a first pixel equal to zero,
storing the garland count in the first pixel,
calculating a memory location of a next pixel in a current garland,
detecting whether a next pixel at the calculated memory location in the current garland is an initial pixel in the current garland,
if the next pixel is not the initial pixel in the current garland, storing the garland count at the next pixel and repeating the steps of calculating, detecting and storing until the next pixel is the initial pixel in the current garland,
if the next pixel is the initial pixel in the current garland, incrementing the garland count and repeating the steps of searching, storing, calculating, detecting and storing until the step of searching fails to find a zero pixel, whereupon the current garland count corresponds to the number of garlands in the image and each first pixel memory location corresponds to the initial pixel for a corresponding garland;
for each pixel in each identified garland starting at the corresponding identified initial pixel:
storing a current pixel,
calculating the memory location of a next pixel in the corresponding garland,
recalling a next pixel from the calculated memory location in the memory,
storing the recalled next pixel,
saving the stored pixel into the memory at the calculated memory location, and
changing the next pixel into the current pixel and repeating for all pixels in said closed path of chain links of each garland of the spanning set of garlands.

2. The method of claim 1, wherein:
said step of detecting whether a next pixel at the calculated memory location in the current garland is an initial pixel in the current garland includes determining the next pixel is not the initial pixel in the current garland if the pixel is zero and determining the next pixel is the initial pixel in the current garland if the pixel equals the current garland count.

3. The method of claim 1, wherein:
said step of detecting whether a next pixel at the calculated memory location in the current garland is an initial pixel in the current garland includes determining the next pixel is not the initial pixel in the current garland if calculated memory location does not equal the memory location of the initial pixel and determining the next pixel is the initial pixel in the current garland if the calculate memory location equals the memory location of the initial pixel.

4. The method of claim 1, wherein:
said steps of identifying said spanning set of garlands corresponding to an initial image and identifying said initial pixel for each of said identified garlands includes recalling precalculated data indicative of said spanning set of garlands and each initial pixel from memory.

5. The method of claim 4, wherein:
said precalculated data indicative of said spanning set of garlands and each initial pixel includes data indicative of a number of garlands in said spanning set of garlands and a memory location corresponding to each initial pixel.

6. The method of claim 1, wherein:
said method operates on chain links of plural identified garlands simultaneously.

7. The method of claim 1, further comprising:
identifying at least one intermediate pixel for at least one of the identified garlands; and
said method operates on plural chain links of said at least one identified garland simultaneously, beginning at said initial pixel and each intermediate pixel of said at least one identified garland and stopping upon reaching said initial pixel or one of said at least one intermediate pixel.

8. A method of in-place image rotation of an image stored in a memory from an original image to a rotated image comprising the steps of:
identifying a set of tiles encompassing said original image;
rearranging pixels within plural data words spanning each tile, dividing rearranged pixels into plural super-pixels of contiguous pixels;
identifying a spanning set of garlands corresponding to said original image, each garland consisting of a closed path of chain links including an initial chain link from a memory location of an initial tile in said original image to an intermediate memory location of said initial tile in said rotated image and subsequent chain links from a prior intermediate memory location of a prior intermediate tile in the original image to a further intermediate memory location of said prior intermediate tile in said rotated image, until said further intermediate memory location returns to said memory location of said initial tile, said spanning set of garlands together identifying all data movement necessary to transform said original image into said rotated image by moving each tile only once from a memory location in said original image to a memory location in said rotated image;
identifying an initial super-pixel for each of the identified garlands;
said steps of identifying a spanning set of garlands corresponding to an initial image and identifying an initial super-pixel for each of the identified garlands include
filling an image buffer having dimensions equal to dimensions of the image in tiles with zeros,
initializing a garland count to 1, and repetitively until all tiles of the image buffer are non-zero:
searching the image buffer for a first tile equal to zero,
storing the garland count in the first tile,
calculating a memory location of a next tile in a current garland,
detecting whether a next tile at the calculated memory location in the current garland is an initial tile in the current garland,
if the next tile is not the initial tile in the current garland, storing the garland count at the next tile and repeating the steps of calculating, detecting and storing until the next tile is the initial tile in the current garland,
if the next tile is the initial tile in the current garland, incrementing the garland count and repeating the steps of searching, storing, calculating, detecting and storing until the step of searching fails to find a zero tile, whereupon the current garland count corresponds to the number of garlands in the image and each first tile memory location corresponds to the initial super-pixel for a corresponding garland;

for each in each identified garland starting at the corresponding identified initial super-pixel:
    storing a current super-pixel,
    calculating the memory location of a next super-pixel in the corresponding garland,
    recalling a next super-pixel from the calculated memory location in the memory,
    storing the recalled next super-pixel,
    saving the stored super-pixel into the memory at the calculated memory location, and
    changing the next super-pixel into the current super-pixel and repeating for all super-pixels in said closed path of chain links of each garland of the spanning set of garlands.

9. The method of claim 8, wherein:
said step of detecting whether a next tile at the calculated memory location in the current garland is an initial tile in the current garland includes determining the next tile is not the initial tile in the current garland if the tile is zero and determining the next tile is the initial tile in the current garland if the tile equals the current garland count.

10. The method of claim 8, wherein:
said step of detecting whether a next tile at the calculated memory location in the current garland is an initial tile in the current garland includes determining the next tile is not the initial tile in the current garland if calculated memory location does not equal the memory location of the initial tile and determining the next tile is the initial tile in the current garland if the calculate memory location equals the memory location of the initial tile.

11. The method of claim 8, wherein:
said steps of identifying said spanning set of garlands corresponding to an initial image and identifying said initial tile for each of said identified garlands includes recalling precalculated data indicative of said spanning set of garlands and each initial tile from memory.

12. The method of claim 11, wherein:
said precalculated data indicative of said spanning set of garlands and each initial pixel includes data indicative of a number of garlands in said spanning set of garlands and a memory location corresponding to each initial tile.

13. The method of claim 8, wherein:
said method operates on chain links of plural identified garlands simultaneously.

14. The method of claim 8, further comprising:
identifying at least one intermediate super-pixel for at least one of the identified garlands; and
said method operates on plural chain links of said at least one identified garland simultaneously, beginning at said initial super-pixel and each intermediate super-pixel of said at least one identified garland and stopping upon reaching said initial super-pixel or one of said at least one intermediate super-pixel.

15. The method of claim 8, wherein:
said method is practiced using a data processor having a first data size; and
each super-pixel has a data size equal to said first data size.

16. The method of claim 8, wherein:
said method is practiced using a synchronous dynamic random access memory having a first burst size; and
each super-pixel has a data size equal to said first burst size.

\* \* \* \* \*